(12) United States Patent
Matsuda et al.

(10) Patent No.: US 11,860,089 B2
(45) Date of Patent: Jan. 2, 2024

(54) RECEIVER, EARLY ANOMALY DETECTION SYSTEM AND METHOD, AND COMPUTER-READABLE MEDIUM

(71) Applicant: NEC Corporation, Tokyo (JP)

(72) Inventors: Yuma Matsuda, Tokyo (JP); Akihiro Tanaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 217 days.

(21) Appl. No.: 17/426,242

(22) PCT Filed: Jan. 31, 2019

(86) PCT No.: PCT/JP2019/003273
§ 371 (c)(1),
(2) Date: Jul. 28, 2021

(87) PCT Pub. No.: WO2020/157882
PCT Pub. Date: Aug. 6, 2020

(65) Prior Publication Data
US 2022/0099570 A1    Mar. 31, 2022

(51) Int. Cl.
*G01N 21/39*        (2006.01)

(52) U.S. Cl.
CPC ....... *G01N 21/39* (2013.01); *G01N 2201/126* (2013.01)

(58) Field of Classification Search
CPC ............. G01N 21/39; G01N 2201/126; G01N 2201/0691; G01J 3/027; G01J 11/00
USPC ....................................................... 356/402
See application file for complete search history.

(56) References Cited

U.S. PATENT DOCUMENTS

| 2006/0044562 | A1 | 3/2006 | Hagene et al. |
| 2007/0131882 | A1 | 6/2007 | Richman |
| 2007/0167832 | A1 | 7/2007 | Yaniv et al. |
| 2011/0270113 | A1 | 11/2011 | Heyne et al. |
| 2012/0065948 | A1 | 3/2012 | Tan et al. |
| 2012/0223232 | A1* | 9/2012 | Kubota ............... G01N 21/3581 250/338.5 |
| 2015/0338342 | A1 | 11/2015 | Muramatsu et al. |

FOREIGN PATENT DOCUMENTS

| BR | 112019014338 A2 * | 2/2020 | ......... G01K 11/3206 |
| JP | H04326041 A | 11/1992 | |
| JP | 2005083876 A | 3/2005 | |

(Continued)

OTHER PUBLICATIONS

Japanese Office Action for JP Application No. 2020-569250, dated Dec. 13, 2022 with English Translation.

(Continued)

*Primary Examiner* — Md M Rahman
(74) *Attorney, Agent, or Firm* — Sughrue Mion, PLLC

(57) ABSTRACT

A detection unit receives an optical signal that has passed through a space to be measured. A spectrum extraction unit extracts a range to be measured from the optical signal received by the detection unit. The spectrum extraction unit extracts an optical signal formed as a gas molecule of a gas to be measured absorbs energy of the optical signal. A determination unit determines the presence of an anomaly in the space to be measured based on a waveform of the optical signal extracted by the spectrum extraction unit.

17 Claims, 16 Drawing Sheets

(56) References Cited

FOREIGN PATENT DOCUMENTS

| | | | |
|---|---|---|---|
| JP | 2009041941 A | 2/2009 | |
| JP | 2009518654 A | 5/2009 | |
| JP | 2009-222598 A | 10/2009 | |
| JP | 2011149718 A | 8/2011 | |
| JP | 2013-515950 A | 5/2013 | |
| JP | 2013-537307 A | 9/2013 | |
| WO | 2014106940 A1 | 7/2014 | |

OTHER PUBLICATIONS

International Search Report for PCT Application No. PCT/JP2019/003273, dated Apr. 23, 2019.
Okayama Yoshiaki, "A Primitive Study of a Fire Detection Method Controlled by Artificial Neural Net", Fire Safety Journal 17, 1991, pp. 535-553, Elsevier Science Publishers Ltd.
Iseki Takaya, "Trace Gas Detection Technique Using Near Infrared Semiconductor Laser", Journal of the Japan Society of Mechanical Engineers, Jan. 2004, pp. 51, vol. 107, No. 1022, Japan.
Saito Hayato et al., "Measurement of atmospheric carbon dioxide by applying differential absorption spectroscopy in the near infrared region", 31st Laser Sensing Symposium, Lidar observation (CO2 measurement) D-3, Distributed Sep. 13, 2013, pp. 100-103.

\* cited by examiner

US 11,860,089 B2

RECEIVER, EARLY ANOMALY DETECTION SYSTEM AND METHOD, AND COMPUTER-READABLE MEDIUM

This application is a National Stage Entry of PCT/JP2019/003273 filed on Jan. 31, 2019, the contents of all of which are incorporated herein by reference, in their entirety.

TECHNICAL FIELD

The present disclosure relates to anomaly detection systems and methods and computer-readable media and relates more specifically to an anomaly detection system and method and a computer-readable medium that determine the presence of an anomaly based on a change in the intensity of an optical signal that has traveled through a space to be measured.

The present disclosure further relates to a receiver that can be used in the above anomaly detection system.

BACKGROUND ART

When an anomaly such as a fire inside a tunnel, spontaneous combustion of coal, or a gas leakage from a pipeline has occurred, measures need to be taken promptly in order to keep the damage from spreading. To that end, such an anomaly needs to be detected as early as possible. An optical gas detection system is known as an anomaly detection system. The optical gas detection system emits light into a space to be measured and measures the concentration of a gas or smoke based on a change in the intensity of that optical signal. The use of such an optical gas detection system makes it possible to monitor a wide area at a high response speed, as compared to a case where a system that utilizes a semiconductor sensor is used.

At an initial stage of an anomaly such as a fire or a gas leakage where a gas arises, only a small amount of gas is produced. Therefore, in order to detect an anomaly where a gas arises at an early stage, the presence of the gas needs to be detected accurately while the amount of gas that has arisen is still small.

As some examples of the optical gas detection system, those disclosed in Patent Literatures 1 and 2 and Non Patent Literature 1 are known. Patent Literature 1 discloses a method of detecting a fire by use of an optical gas detection system. The optical gas detection system disclosed in Patent Literature 1 emits an optical signal into a space to be measured and measures the concentration of a gas of interest within the space to be measured and the transmittance based on a change in the intensity of the optical signal that has traveled through the space. The method of detecting a fire disclosed in Patent Literature 1 uses two determination criteria and thus enables a more accurate detection with a reduced false report rate.

Patent Literature 2 discloses a gas absorption spectroscopic device. The gas absorption spectroscopic device disclosed in Patent Literature 2 irradiates a gas to be measured with laser light of a variable wavelength and obtains a spectral profile indicating a change in the intensity of the laser light that has traveled through the gas to be measured with respect to the wavelength. The gas absorption spectroscopic device performs, on the spectral profile, polynomial approximation through an approximate polynomial within a predetermined wavelength range at each point of the wavelength and creates an nth-order derivative curve that includes the zeroth order of the spectral profile based on the coefficient of each term of the approximate polynomial at each point. According to Patent Literature 2, the physical quantity of a gas to be measured is determined based on the created nth-order derivative curve, and this makes it possible to measure the concentration of the gas can be measured with a high accuracy even in a high-speed measurement.

Furthermore, Non Patent Literature 1 discloses a method in which the machine learning is performed on the temperature acquired from a temperature sensor and the information on the concentration of smoke and the concentration of a gas acquired from a smoke sensor and a CO sensor and the risk of a fire is detected. According to the method disclosed in Non Patent Literature 1, the temperature, the concentration of smoke, and the concentration of CO are used as input data of a neural network, and the likelihood and the risk of a fire are calculated. The method disclosed in Non Patent Literature 1 enables an accurate detection through the use of the three criteria and the machine learning.

An optical gas detection system utilizes a characteristic where a gas to be measured absorbs light at a wavelength unique to each substance. There are generally two techniques for calculating the concentration of a gas. In the first technique, with the use of a narrow-wavelength-band light source that outputs light at a wavelength around an absorption wavelength, a gas is detected through wavelength modulation. Wavelength modulation spectroscopy (WMS) disclosed in Non Patent Literature 2 is one example of this first technique. In the second technique, with the use of a broad-wavelength-band light source, the concentration of a gas is calculated based on a known spectral intensity. Differential optical absorption spectroscopy (DOAS) disclosed in Non Patent Literature 3 is one example of this second technique.

CITATION LIST

Patent Literature

Patent Literature 1: Japanese Unexamined Patent Application Publication No. 2005-83876
Patent Literature 2: International Patent Publication No. WO2014/106940

Non Patent Literature

Non Patent Literature 1: Yoshiaki Okayama, Nohmi Bosai, "A Primitive Study of a Fire Detection Method Controlled by Artificial Neural Net," Fire Safety Journal 17, 1991, pp. 535-553.
Non Patent Literature 2: Takaya Iseki, "Trace Gas Detection Technique Using Near Infrared Semiconductor Laser," Journal of the Japan Society of Mechanical Engineers, Vol. 107, No. 1022, p. 51, 2004.
Non Patent Literature 3: Hayato Saito, et al., "Measurement of Atmospheric Carbon Dioxide Absorption through Application of Differential Absorption Spectroscopy in Near-Infrared Region," 31st Laser Sensing Symposium, D-3, 2013.

SUMMARY OF INVENTION

Technical Problem

A gas to be measured absorbs energy at a specific wavelength when an optical signal passes through that gas. An optical gas detection system is calibrated by use of a standard gas at various concentrations and based on the mapping between the concentration of a gas being used and a change in the intensity of an optical signal that decreases as the optical signal is absorbed by that gas. Therefore, the accuracy of the measured concentration of the gas is greatly influenced by the accuracy of the standard gas. In order to detect the risk of a fire or the like at its early stage by use of an anomaly detection system that uses an optical detection system, a small change in the concentration of a gas needs to be captured. The methods disclosed in Patent Literature 1 and Non Patent Literature 1 use the concentration of a gas as one criterion for detecting an anomaly. In Patent Literature 2 as well, the concentration of a gas to be measured is measured, and this measurement requires calibration performed by use of a standard gas. In the devices and methods disclosed in these literatures, the concentration to be measured is influenced by the accuracy of a standard gas, and thus the risk of a fire cannot be detected accurately based on a slight change in the concentration. This poses a problem of low detection accuracy at an initial stage of an anomaly.

The present disclosure has been made in view of the above situation and is directed to providing a receiver, an anomaly detection system and method, and a computer-readable medium that can detect an anomaly without being influenced by the accuracy of a standard gas.

Solution to Problem

To address the issues described above, the present disclosure provides a receiver that includes: detection means configured to receive an optical signal that has passed through a space to be measured; spectrum extraction means configured to extract a range to be measured from the optical signal received by the detection means; and determination means configured to determine the presence of an anomaly in the space to be measured based on a waveform of an optical signal extracted by the spectrum extraction means and formed as a gas molecule of a gas to be measured absorbs energy of the optical signal.

The present disclosure further provides an anomaly detection system that includes: a transmitter configured to transmit an optical signal into a space to be measured; and a receiver configured to receive the optical signal that has passed through the space to be measured, wherein the receiver includes: detection means configured to receive the optical signal; spectrum extraction means configured to extract a range to be measured from the optical signal received by the detection means; and determination means configured to determine the presence of an anomaly in the space to be measured based on a waveform of an optical signal extracted by the spectrum extraction means and formed as a gas molecule of a gas to be measured absorbs energy of the optical signal.

The present disclosure provides an anomaly detection method that includes: receiving an optical signal that has passed through a space to be measured; extracting a range to be measured from the received optical signal; and determining the presence of an anomaly in the space to be measured based on an extracted waveform of an optical signal formed as a gas molecule of a gas to be measured absorbs energy of the optical signal.

The present disclosure provides a computer-readable medium storing a program that causes a processor to execute a process for: extracting a range to be measured from a received optical signal that has passed through a space to be measured; and determining the presence of an anomaly in the space to be measured based on an extracted waveform of an optical signal formed as a gas molecule of a gas to be measured absorbs energy of the optical signal.

Advantageous Effects of Invention

The present disclosure provides a receiver, an anomaly detection system and method, and a computer-readable medium that can detect an anomaly without being influenced by the accuracy of a standard gas.

DESCRIPTION OF EMBODIMENTS

Hereinafter, some example embodiments of the present disclosure will be described in detail with reference to the drawings.

First Example Embodiment

Figure 1:
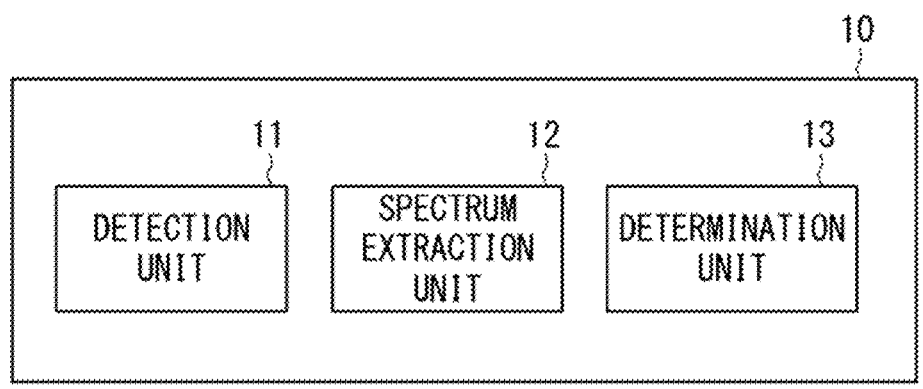
FIG. 1 is a block diagram illustrating a receiver according to a first example embodiment of the present disclosure.

FIG. 1 illustrates a receiver according to a first example embodiment of the present disclosure. A receiver 10 includes a detection unit 11, a spectrum extraction unit 12, and a determination unit 13. The receiver 10 is used in an anomaly detection system, for example. At least a part of the detection unit 11, the spectrum extraction unit 12, and the determination unit 13 may be constructed by hardware, such as a circuit or a chip.

The detection unit (detection means) 11 receives an optical signal that has passed through a space to be measured. The detection unit 11 includes, for example, a sensor that converts an optical signal to an electric signal. The detection unit 11 receives an optical signal that is wavelength-swept within a predetermined wavelength range, for example. The wavelength of the optical signal includes an absorption band of a molecule of a gas (a gas to be measured) that arises when an anomaly to be detected has occurred. In this example, the absorption band refers to a wavelength range in which light is absorbed by a given substance when that substance is irradiated with light.

The spectrum extraction unit (spectrum extraction means) 12 extracts a range to be measured, such as a wavelength range to be measured or a time range to be measured, from an optical signal received by the detection unit 11. In a case where the optical signal is wavelength-modulated, for example, the spectrum extraction unit 12 extracts, as the range to be measured, a range corresponding to a predetermined wavelength range that includes the absorption band from the distribution of the intensity of the optical signal.

The wavelength range of the optical signal to be extracted by the spectrum extraction unit 12 may vary depending on the type or the like of an anomaly to be detected. The spectrum extraction unit 12 extracts an optical signal of a wavelength band corresponding to a gas (a gas to be measured) that serves as a criterion for determining the presence of an anomaly. For example, in a case where a fire is to be detected, carbon dioxide and carbon monoxide are produced during a fire. Therefore, the spectrum extraction unit 12 may extract a wavelength range in which carbon dioxide and carbon monoxide absorb energy to detect a fire.

The spectrum extraction unit 12 may further extract a feature from an extracted optical signal. The spectrum extraction unit 12 further extracts, from an extracted optical signal, a feature indicating an amount of an absorbed optical signal, or a feature indicating the wavelength range in which the intensity of the optical signal changes as the optical signal is absorbed, or both.

The determination unit (determination means) 13 determines the presence of an anomaly based on an optical signal (its waveform) in the wavelength range extracted by the spectrum extraction unit 12. The determination unit 13 determines the presence of an anomaly based on a feature of the optical signal extracted by the spectrum extraction unit 12, for example.

Figure 2:
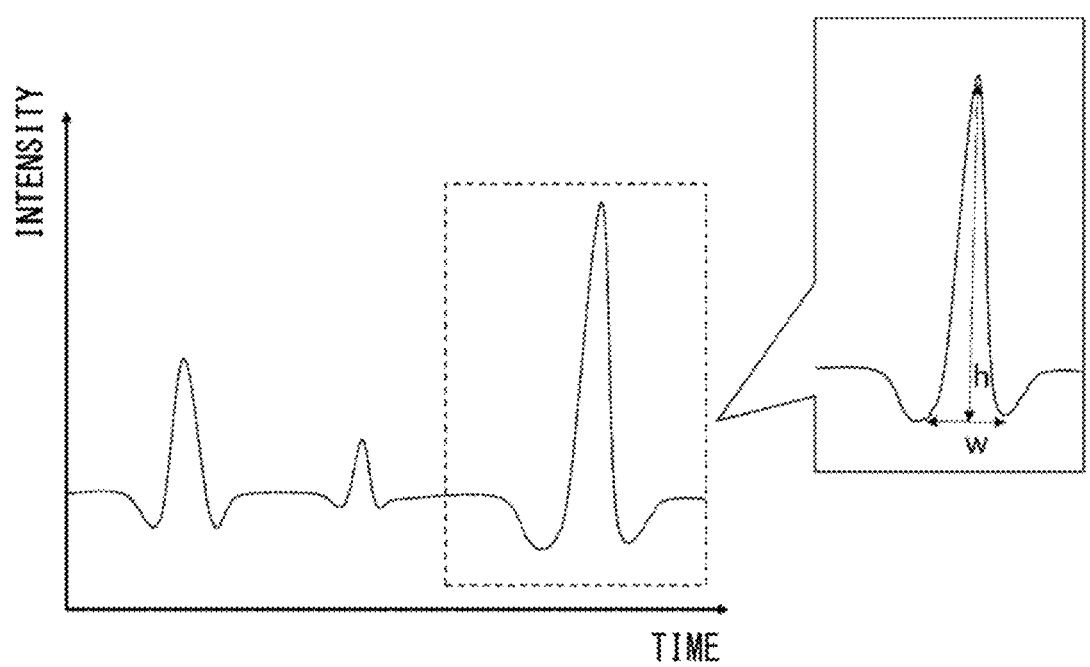
FIG. 2 is a waveform diagram illustrating an example of an optical signal received by a detection unit.

FIG. 2 illustrates an example of an optical signal received by the detection unit 11. In this example, the optical signal is wavelength-modulated. The optical signal illustrated in FIG. 2 is a signal corresponding to one instance of wavelength sweeping. In FIG. 2, the vertical axis represents the intensity of the optical signal. The horizontal axis represents the time or the wavelength. In FIG. 2, the optical signal received by the detection unit 11 has three peaks, and each peak indicates an absorption spectrum at the corresponding wavelength. Of the three peaks, the rightmost peak on the paper plane (the wavelength at the peak) corresponds to the absorption band of the gas to be measured.

In response to the detection unit 11 receiving an optical signal of the spectrum illustrated in FIG. 2, the spectrum extraction unit 12 extracts an optical signal in the range enclosed by the dashed line in FIG. 2. The spectrum extraction unit 12 further extracts, from the peak of the optical signal, at least one of a distance h or a distance (width) w as a feature of the optical signal. The distance h is a difference between a local maximum and a local minimum of the signal intensity, and the width w is a difference in the wavelength between two local minima. The distance h indicates a difference in the optical intensity in the absorption band (an absorption amount). Meanwhile, the width w indicates the wavelength range in which the intensity of the optical signal changes as the optical signal is absorbed.

The distance h and the width w each vary between in an anomalous state and in a normal state (a state with no anomaly). The determination unit 13 compares the extracted distance h and width w against their respective thresholds. The thresholds are determined based on the distance h and the width w held in an anomalous state and the distance h and the width w held in a normal state. Each threshold is set to a value that is greater than the value held in a normal state and smaller than the value held in an anomalous state, for example. The determination unit 13 determines that an anomaly has occurred if at least one of the distance h or the width w is no smaller than its threshold. The determination unit 13 determines that the state is normal if the distance h and the width w are smaller than their thresholds.

Figure 3:
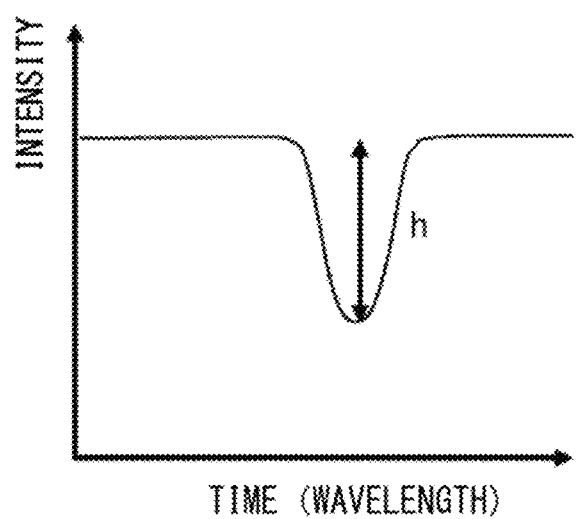
FIG. 3 is a waveform diagram illustrating another example of an optical signal received by the detection unit.

FIG. 3 illustrates another example of an optical signal received by the detection unit 11. In this example, the optical signal is not wavelength-modulated. The optical signal illustrated in FIG. 3 is a signal corresponding to one instance of wavelength sweeping. In FIG. 3, the vertical axis represents the intensity of the optical signal. The horizontal axis represents the time or the wavelength. In a case where an optical signal is not wavelength-modulated, the intensity of the optical signal has a local minimum at a wavelength in the absorption band of a gas to be measured. In that case, the spectrum extraction unit 12 extracts, as a feature, a distance h that is the difference between the intensity at a local maximum of the optical signal and the intensity at another portion of the optical signal. The distance h varies in accordance with the amount of gas to be measured. Therefore, the presence of an anomaly can be determined by comparing the distance h against its threshold.

The wavelength range to be extracted by the spectrum extraction unit 12 is not limited to one wavelength range. For example, the spectrum extraction unit 12 may extract three wavelength ranges corresponding to the respective peaks in the optical signal illustrated in FIG. 2. In that case, the determination unit 13 may determine the presence of an anomaly based on the features of the optical signal in these three wavelength ranges. Increasing the number of features used in the determination can help improve the accuracy in determining the presence of an anomaly.

A related art that includes the method of detecting a fire disclosed in Patent Literature 1 uses a gas concentration calculation unit, and this gas concentration calculation unit, by use of a standard gas, calculates the concentration of the gas based on the intensity of an optical signal received by a detection unit. A determination unit compares the calculated concentration of the gas against a preset threshold and determines that there is an anomaly if the concentration of the gas exceeds the threshold. The related art requires calibration performed by use of a standard gas, and the accuracy of the standard gas may cause a decrease in the accuracy in detecting an anomaly.

The gas absorption spectroscopic device disclosed in Patent Literature 2 is also calibrated based on the mapping between the concentration of a standard gas and a change in the area or the height of a peak in the intensity of an optical signal, and the concentration is calculated accordingly. Therefore, an error in the measured value of the concentration may increase depending on the standard gas used in the calibration. This can make it impossible to determine whether a change in the concentration is the small change in the concentration observed at the initial stage of a fire or is caused by a measurement error, which in turn makes it impossible to determine the threshold for anomaly determination. In this manner, in a case where the gas absorption spectroscopic device disclosed in Patent Literature 2 is used in an anomaly detection system as well, the problem of a decrease in the detection accuracy associated with the accuracy of the standard gas cannot be solved.

In contrast, according to the present disclosure, the spectrum extraction unit 12 extracts an optical signal in a predetermined wavelength range that includes the absorption band of a gas to be measured. The determination unit 13 determines the presence of an anomaly based on the waveform of the optical signal extracted by the spectrum extraction unit 12. For example, the determination unit 13 determines the presence of an anomaly based on a feature extracted by the spectrum extraction unit 12 from the optical signal in the predetermined wavelength range. According to the present disclosure, the receiver 10 can determine the presence of an anomaly, such as a fire or a gas leakage, where a gas or smoke is produced, without converting a change over time in the waveform of a light reception signal to the concentration. According to the present disclosure, the presence of an anomaly is determined based on an optical signal observed before calibration is performed by use of a standard gas. This can eliminate any decrease in the accuracy in detecting an anomaly that could result from an influence of the accuracy of the standard gas. Therefore, the receiver 10 can detect an anomaly accurately even at an initial stage of the anomaly where the change in the concentration of a gas is small.

Second Example Embodiment

Figure 4:
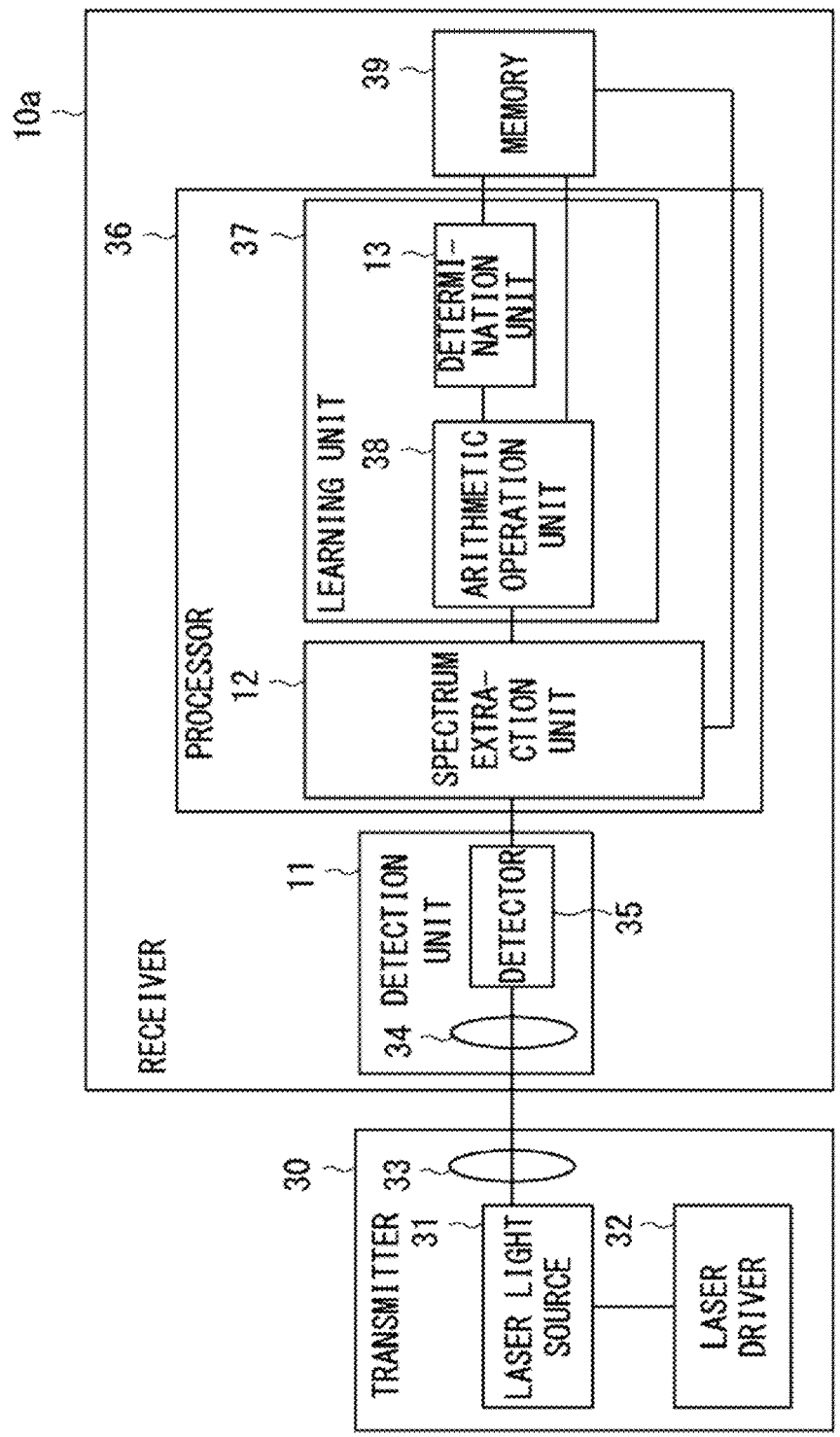
FIG. 4 is a block diagram illustrating an anomaly detection system according to a second example embodiment of the present disclosure.

Next, a second example embodiment of the present disclosure will be described. FIG. 4 illustrates an anomaly detection system according to the second example embodiment of the present disclosure. According to the present example embodiment, the anomaly detection system includes a receiver 10a and a transmitter 30. The transmitter 30 transmits an optical signal into a space to be measured. The receiver 10a receives an optical signal that has passed through the space to be measured.

The transmitter 30 includes a laser light source 31, a laser driver 32, and a condenser 33. The laser light source 31 is a light source and emits laser light into a space to be measured. The laser driver 32 is a driver that drives the laser light source 31. The laser driver 32 controls the driving current and the temperature of the laser light source 31 to sweep the wavelength by modulating the wavelength of an optical signal. The laser light source 31 outputs an optical signal at a temporally varying wavelength of around $\lambda 1$ μm. In this example, $\lambda 1$ is a wavelength included in the absorption band of a molecule of a gas to be measured. The condenser 33 converts an optical signal emitted from the laser light source 31 to a subparallel light ray. The condenser 33 includes a lens, for example. The condenser 33 may include, for example, a mirror that changes the traveling direction of the light. The optical signal emitted from the transmitter 30 is received by the receiver 10a.

The receiver 10a includes a detection unit 11, a spectrum extraction unit 12, a learning unit 37, and a memory 39. The spectrum extraction unit 12 and the learning unit 37 may be software or modules whose processes are executed as a processor 36 executes a program stored in a memory. Alternatively, the spectrum extraction unit 12 and the learning unit 37 may be hardware, such as a circuit or a chip.

The processor 36 reads out software (a computer program) from the memory and carries out various processes. The processor 36 may be a microprocessor, a microprocessing unit (MPU), or a central processing unit (CPU), for example. The processor (36) may include a plurality of processors (processor cores).

The memory 39 is constituted by a combination of a volatile memory and a non-volatile memory. The memory 39 may include a storage disposed apart from the processor 36. In this case, the processor 36 may access the memory 39 via an I/O interface (not illustrated). The memory 39 may be used to store software or a set of software modules. The processor 36 may read out the software or the set of software modules from the memory 39 and execute the software or the set of software modules.

The detection unit 11 includes a condenser 34 and a detector 35. The condenser 34 condenses an optical signal transmitted from the transmitter 30. The condenser 34 includes an optical member, such as a lens or a mirror, for example. The condenser 34 converts a subparallel light ray transmitted from the transmitter 30 to convergent light. The detector 35 receives an optical signal via the condenser 34 and converts the received optical signal to an electric signal. The detector 35 includes, for example, a photoelectric conversion element that outputs an electric signal of a signal intensity corresponding to the intensity of a received optical signal.

The spectrum extraction unit 12 extracts a predetermined wavelength range from an optical signal received by the detection unit 11. The spectrum extraction unit 12 extracts the wavelength-swept range of the optical signal in the transmitter 30 as a predetermined wavelength range, for example. The spectrum extraction unit 12 may extract a wavelength range near the absorption band of a gas to be measured as a predetermined wavelength range. In a case where the spectrum extraction unit 12 extracts the entire wavelength range of an optical signal, the spectrum extraction unit 12 may be omitted.

According to the present example embodiment, an operation of the receiver 10a includes an operation performed during learning and an operation performed during use. In the operation performed during learning, the receiver 10a constructs a model for determining whether a given state is anomalous or normal. In the operation performed during use, the receiver 10a determines the presence of an anomaly by use of the model constructed during learning.

During learning, the spectrum extraction unit 12 accumulates an optical signal in the extracted wavelength range into the memory 39. During learning, the spectrum extraction unit 12 puts together the intensity spectra of optical signals obtained in a plurality of instances of wavelength sweeping into one piece of data and accumulates, as training data, this data and a label indicating whether the state is normal or anomalous into the memory 39, for example. During use, the spectrum extraction unit 12 outputs an optical signal of the extracted wavelength range to the learning unit 37.

The learning unit (learning means) 37 includes a determination unit 13 and an arithmetic operation unit 38. During learning, the arithmetic operation unit 38 reads out training data from the memory 39 and performs machine learning with the intensity spectrum of an optical signal serving as an explanatory variable and with the label indicating whether the state is normal or anomalous serving as a response variable, for example. The arithmetic operation unit 38 stores, into the memory 39, a model obtained as a result of learning the waveforms of optical signals observed in a normal state and in an anomalous state.

During use, the arithmetic operation unit 38 reads out, from the memory 39, the model stored during learning. The arithmetic operation unit 38 calculates the likelihood of a state being normal or anomalous based on the pattern of the change in the optical signal measured during use and the read-out model. The arithmetic operation unit 38 calculates the likelihood by applying the intensity spectra of the optical signals obtained in a plurality of instances of wavelength sweeping to the model, for example. The determination unit 13 determines whether a state is anomalous or normal based on the result calculated by the arithmetic operation unit 38. Instead of the arithmetic operation unit 38 calculating the likelihood, the determination unit 13 may calculate the likelihood and determine whether a state is anomalous or normal. Alternatively, the determination unit 13 and the arithmetic operation unit 38 do not have to be separate, and the determination unit 13 may include the arithmetic operation unit 38.

Figure 5:
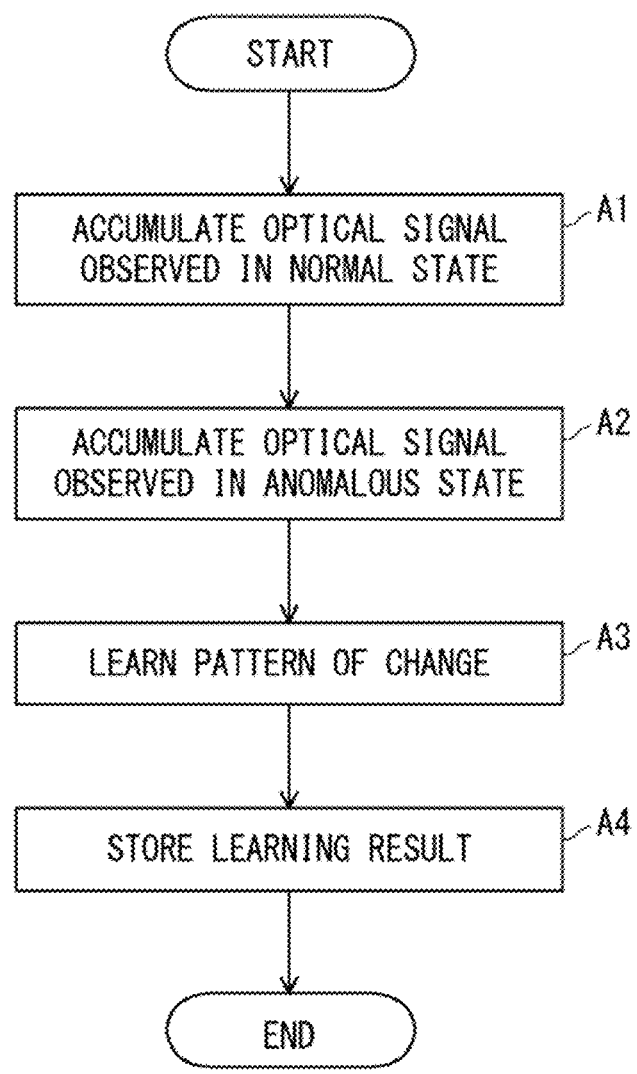
FIG. 5 is a flowchart illustrating a procedure of operations performed during learning.

FIG. 5 illustrates a procedure of operations performed during learning. The spectrum extraction unit 12 accumulates the changes in the intensity (the spectral intensity) of optical signals obtained in normal states into the memory 39 (step A1). In addition, the spectrum extraction unit 12 accumulates the changes in the intensity of optical signals that arise as the optical signals are absorbed by a gas to be measured in anomalous states into the memory 39 separately from the changes in the intensity of the optical signals obtained in normal states (step A2). At each of steps A1 and A2, the spectral intensity of optical signals from sixty instances of wavelength sweeping is put together into one piece of data, and this data and a label indicating whether the state is normal or anomalous are accumulated into the memory 39, for example.

The optical signals accumulated at steps A1 and A2 may be the optical signals that are actually received by the receiver 10*a* or the optical signals that are calculated through simulation or the like. For example, at step A2, a change in the intensity of an optical signal received by the receiver 10*a* may be accumulated in the memory 39 when an anomaly, such as a fire or a gas leakage, has actually occurred. Alternatively, a change in the intensity of an optical signal calculated through simulation may be accumulated into the memory 39.

When a change in the intensity of an optical signal is accumulated, any anomalous value may be excluded.

The arithmetic operation unit 38 learns the changes (the patterns of the changes) in the intensity of the optical signals accumulated at steps A1 and A2 (step A3). At step A3, the arithmetic operation unit 38 learns a model for determining whether a state is normal or anomalous through supervised learning by use of the data accumulated along with the labels at steps A1 and A2 as the training data. A convolutional neural network (CNN), a recurrent neural network (RNN), or the like is used for the learning, for example. The arithmetic operation unit 38 stores the derived learning result into the memory 39 as a model constructed by extracting feature amounts observed in anomalous states or feature amounts observed in normal states (step A4).

Figure 6:
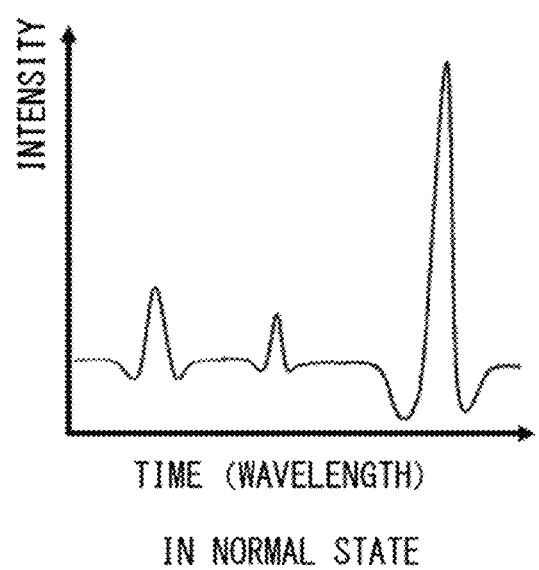
FIG. 6 is a waveform diagram illustrating an example of an optical signal observed in a normal state.
Figure 7:
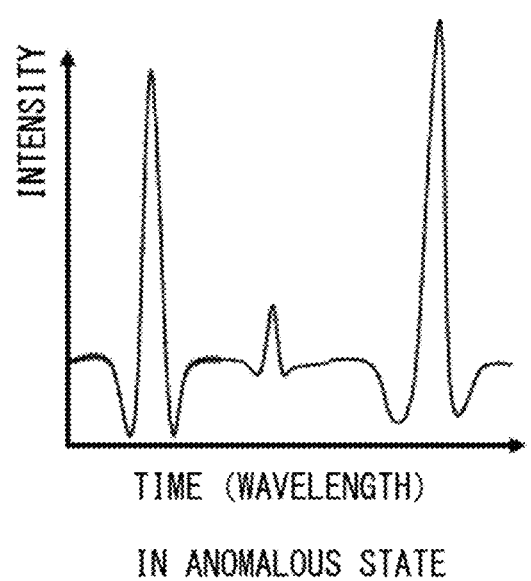
FIG. 7 is a waveform diagram illustrating an example of an optical signal observed in an anomalous state.

FIG. 6 illustrates an example of an intensity spectrum of an optical signal observed in a normal state. FIG. 7 illustrates an example of an intensity spectrum of an optical signal observed in an anomalous state. In FIGS. 6 and 7, the vertical axis represents the intensity of the optical signal, and the horizontal axis represents the time or the wavelength. As illustrated in FIGS. 6 and 7, the intensity spectrum of the optical signal has three peaks. A comparison of FIGS. 6 and 7 shows that the distance (corresponding to the distance h indicated in FIG. 2) between the local maximum and the local minimum increases at each peak in the anomalous state. Moreover, the comparison shows that the ratio between the local maxima at the peaks is smaller in the normal state than in the anomalous state. During learning, having learned such features, a model for determining whether a state is anomalous or normal is constructed.

Figure 8:
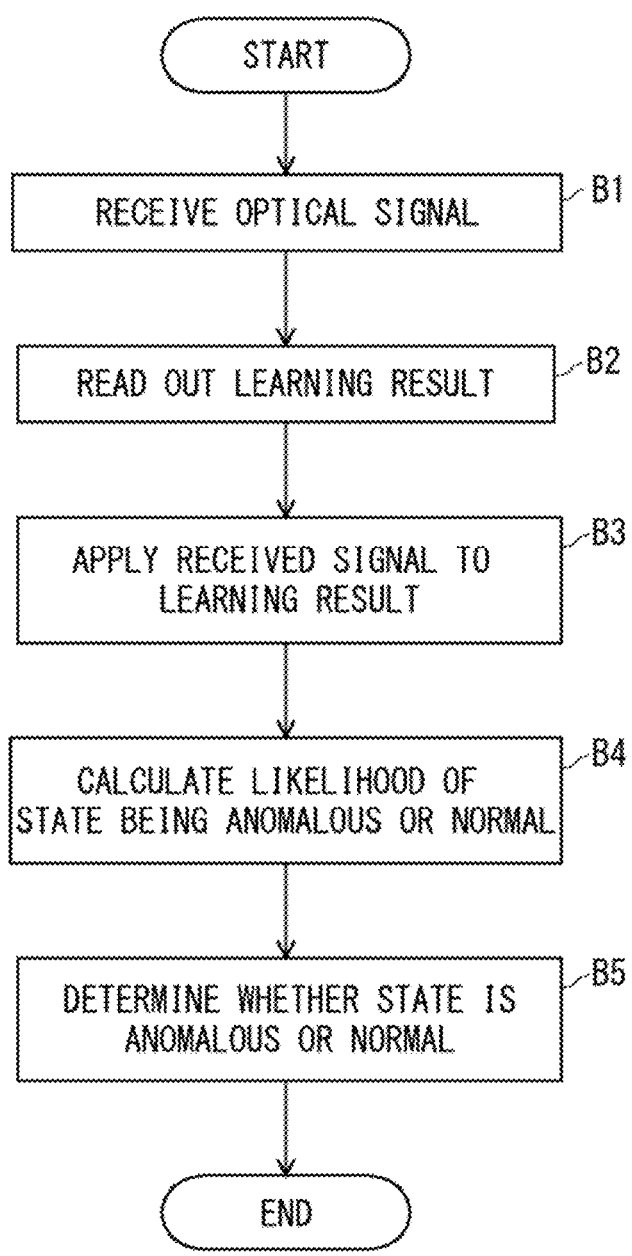
FIG. 8 is a flowchart illustrating a procedure of operations performed during use.

FIG. 8 illustrates a procedure of operations (an anomaly detection method) performed during use. The detection unit 11 receives an optical signal transmitted from the transmitter 30 (step B1). The received optical signal is given to the arithmetic operation unit 38 via the spectrum extraction unit 12. The arithmetic operation unit 38 reads out the model (the learning result) stored at step A4 from the memory 39 (step B2). The arithmetic operation unit 38 applies the change in the intensity of the optical signal received at step B1 to the model read out at step B2 (step B3) and calculates the likelihood of the state being anomalous and/or normal (step B4). The arithmetic operation unit 38 applies the changes in the intensity of the optical signals from sixty instances of wavelength sweeping to the model and calculates the likelihood of the state being anomalous and/or normal, for example.

The determination unit 13 determines whether the state is anomalous or normal based on the likelihood calculated at step B4 (step B5). The determination unit 13 determines that an anomaly has occurred if the likelihood of the state being anomalous is higher than the likelihood of the state being normal, for example. The determination unit 13 determines that the state is normal if the likelihood of the state being anomalous is lower than the likelihood of the state being normal. At step B5, the determination unit 13 may determine that the state is anomalous if the likelihood of the state being anomalous is no lower than a threshold or if the likelihood of the state being normal is no higher than a threshold.

According to the present example embodiment, a model learns the changes in the intensity of optical signals observed in normal states and in anomalous states, and the presence of an anomaly is determined based on the learning result and the optical signal extracted by the spectrum extraction unit 12. According to the present example embodiment as well, the determination as to whether a state is anomalous or normal can be made without calibration performed by use of a standard gas. Therefore, an anomaly observed at its initial stage while the amount of produced gas is still small can be detected without being influenced by the accuracy of a standard gas. The present example embodiment can also eliminate any decrease in the accuracy in detecting an anomaly that could result from an influence of the accuracy of the standard gas, and this can help improve the accuracy in detecting an anomaly.

Third Example Embodiment

Figure 9:
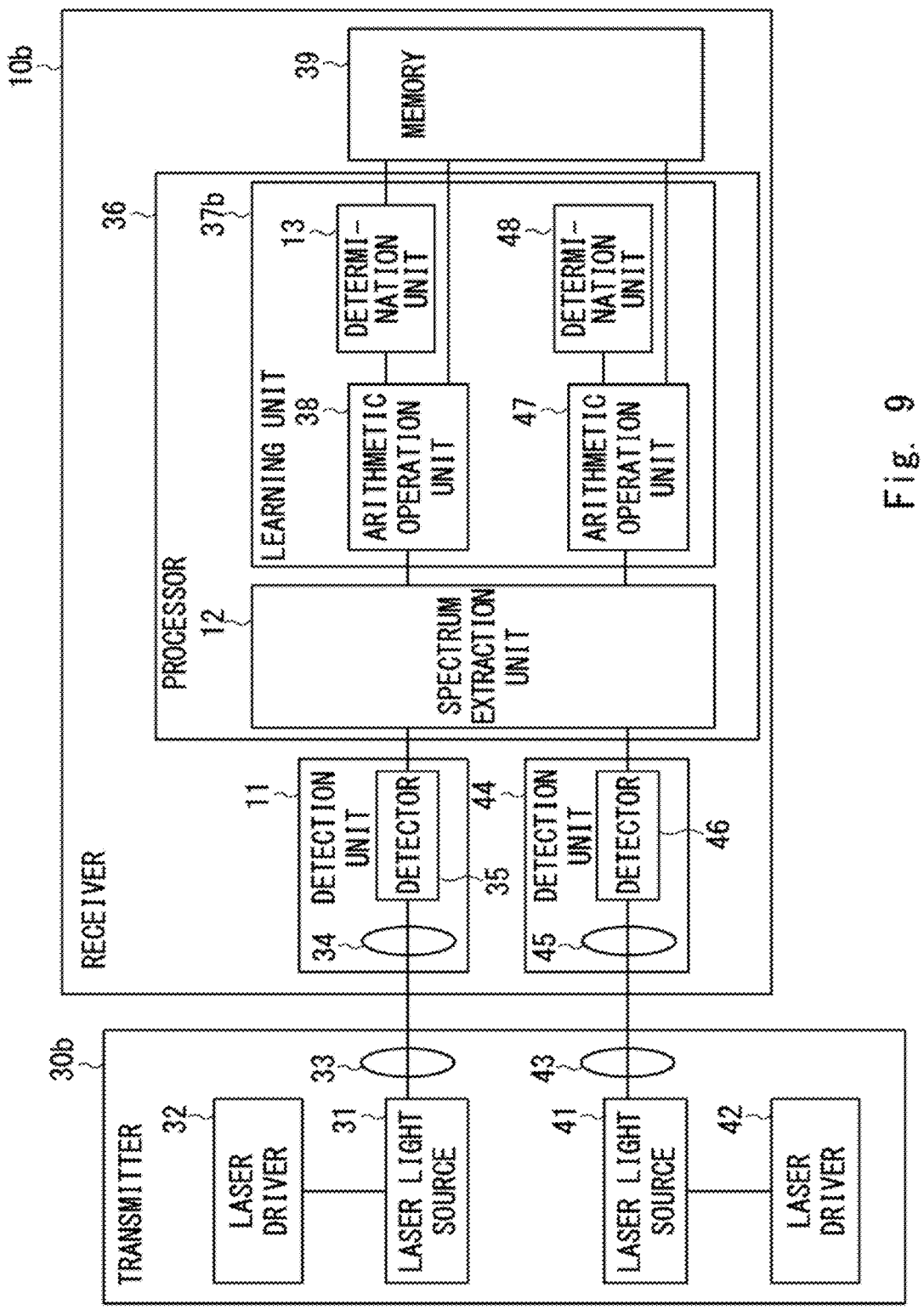
FIG. 9 is a block diagram illustrating an anomaly detection system according to a third example embodiment of the present disclosure.

Next, a third example embodiment of the present disclosure will be described. FIG. 9 illustrates an anomaly detection system according to the third example embodiment of the present disclosure. The present example embodiment differs from the second example embodiment in that a plurality of optical signals are used to detect an anomaly. According to the present example embodiment, a transmitter 30*b* emits optical signals at a plurality of wavelengths. In addition, a receiver 10*b* receives optical signals at a plurality of wavelengths. Other features may be similar to those according to the second example embodiment.

The transmitter 30*b* includes a laser light source 41, a laser driver 42, and a condenser 43, in addition to the components of the transmitter 30 according to the second example embodiment illustrated in FIG. 4. The laser light source 41 emits laser light into the space to be measured. The laser driver 42 drives the laser light source 41. The laser driver 42 controls the driving current and the temperature of the laser light source 41 to sweep the wavelength by modulating the wavelength of an optical signal output from the laser light source 41. The condenser 43 converts an optical signal emitted from the laser light source 41 to a subparallel light ray. The condenser 43 includes a lens, for example. The condenser 43 may include, for example, a mirror that changes the traveling direction of the light.

According to the present example embodiment, the laser light source 31 outputs an optical signal at a temporally varying wavelength of around $\lambda 1$ μm. Meanwhile, the laser light source 41 outputs an optical signal at a temporally varying wavelength of around $\lambda 2$ μm. In this example, $\lambda 1$ and $\lambda 2$ are each a wavelength included in the absorption band of a gas molecule of a gas to be measured. Moreover, $\lambda 1$ and $\lambda 2$ are mutually different wavelengths. Two optical signals output from the transmitter 30b are received by the receiver 10b. In the following, an optical signal output from the laser light source 31 is also referred to as a first optical signal, and an optical signal output from the laser light source 41 is also referred to as a second optical signal.

The receiver 10b includes detection units 11 and 44, a spectrum extraction unit 12, a learning unit 37b, and a memory 39. The spectrum extraction unit 12 and the learning unit 37b may be software or modules whose processes are executed as a processor 36 executes a program stored in a memory. Alternatively, the spectrum extraction unit 12 and the learning unit 37b may be hardware, such as a circuit or a chip.

The detection unit 11 includes a condenser 34 and a detector 35. The detection unit 44 includes a condenser 45 and a detector 46. The learning unit 37b includes arithmetic operation units 38 and 47 and determination units 13 and 48. The detection unit 11, the determination unit 13, the arithmetic operation unit 38, and the memory 39 of the receiver 10b may be similar to those according to the second example embodiment.

The condenser 45 condenses a second optical signal output from the laser light source 41 of the transmitter 30b. The condenser 45 includes an optical member, such as a lens or a mirror, for example. The condenser 45 converts a second optical signal output in the form of a subparallel light ray into convergent light. The detector 46 receives a second optical signal via the condenser 45 and converts the received second optical signal into an electric signal. The detector 46 includes, for example, a photoelectric conversion element that outputs an electric signal of a signal intensity corresponding to the intensity of a received second optical signal.

The spectrum extraction unit 12 extracts a predetermined wavelength range from each of a first and a second optical signal received by the detection units 11 and 44, respectively. The spectrum extraction unit 12 extracts, as a predetermined wavelength range, the wavelength-swept range of the laser light source 31 from a first optical signal received by the detection unit 11, for example. In addition, the spectrum extraction unit 12 extracts, as a predetermined wavelength range, the wavelength-swept range of the laser light source 41 from a second optical signal received by the detection unit 44, for example.

During learning, the spectrum extraction unit 12 accumulates, for each optical signal, the optical signal in the extracted wavelength range into the memory 39. During learning, the spectrum extraction unit 12 puts together, for each optical signal, the intensity spectra of the optical signals obtained in a plurality of instances of wavelength sweeping into one piece of data and accumulates that data and a label indicating whether the state is normal or anomalous into the memory 39 as training data, for example. In the following, training data corresponding to a first optical signal is also referred to as first training data, and training data corresponding to a second optical signal is also referred to as second training data. During use, the spectrum extraction unit 12 outputs, for each optical signal, the optical signal in the extracted wavelength range to the learning unit 37.

During learning, the arithmetic operation unit 38 included in the learning unit 37b reads out the first training data from the memory 39 and performs machine learning with the intensity spectrum of the first optical signal serving as an explanatory variable and with the label indicating whether the state is normal or anomalous serving as a response variable, for example. The arithmetic operation unit 38 stores the model obtained as a result of leaning into the memory 39. Meanwhile, during learning, the arithmetic operation unit 47 reads out the second training data from the memory 39 and performs machine learning with the intensity spectrum of the second optical signal serving as an explanatory variable and with the label indicating whether the state is normal or anomalous serving as a response variable, for example. The arithmetic operation units 38 and 47 each store the model obtained as a result of learning into the memory 39. In the following, a model generated by the arithmetic operation unit 38 is also referred to as a first model, and a model generated by the arithmetic operation unit 47 is also referred to as a second model.

During use, the arithmetic operation unit 38 reads out a first model stored during learning from the memory 39. The arithmetic operation unit 38 calculates the likelihood of a state being normal or anomalous based on the pattern of the change in the first optical signal observed during use and the read-out first model. In a similar manner, during use, the arithmetic operation unit 47 reads out a second model stored during learning from the memory 39. The arithmetic operation unit 47 calculates the likelihood of a state being normal or anomalous based on the pattern of the change in the second optical signal observed during use and the read-out second model. The determination unit 13 determines whether the state is anomalous or normal based on the result calculated by the arithmetic operation unit 38. The determination unit 48 determines whether the state is anomalous or normal based on the result calculated by the arithmetic operation unit 47.

The procedures of operations performed during learning and during use according to the present example embodiment may be similar to the procedures of operations according to the second example embodiment illustrated in FIGS. 5 and 8 except that a plurality of optical signals are used according to the present example embodiment. According to the present example embodiment, a plurality of optical signals are used to detect an anomaly, and an anomaly can be detected based on a plurality of determination criteria. For example, a gas produced in an anomalous state includes a plurality of gasses with different absorption band wavelengths. In that case, the use of optical signals at a plurality of wavelengths corresponding to the absorption bands of a plurality of gasses to be measured makes it possible to increase the number of gasses to be measured serving as criteria for detecting an anomaly, as compared to the second example embodiment. Accordingly, as compared to the second example embodiment, the determination as to whether a state is anomalous or normal can be made more accurately, and this can help improve the accuracy in detecting an anomaly.

Fourth Example Embodiment

Figure 10:
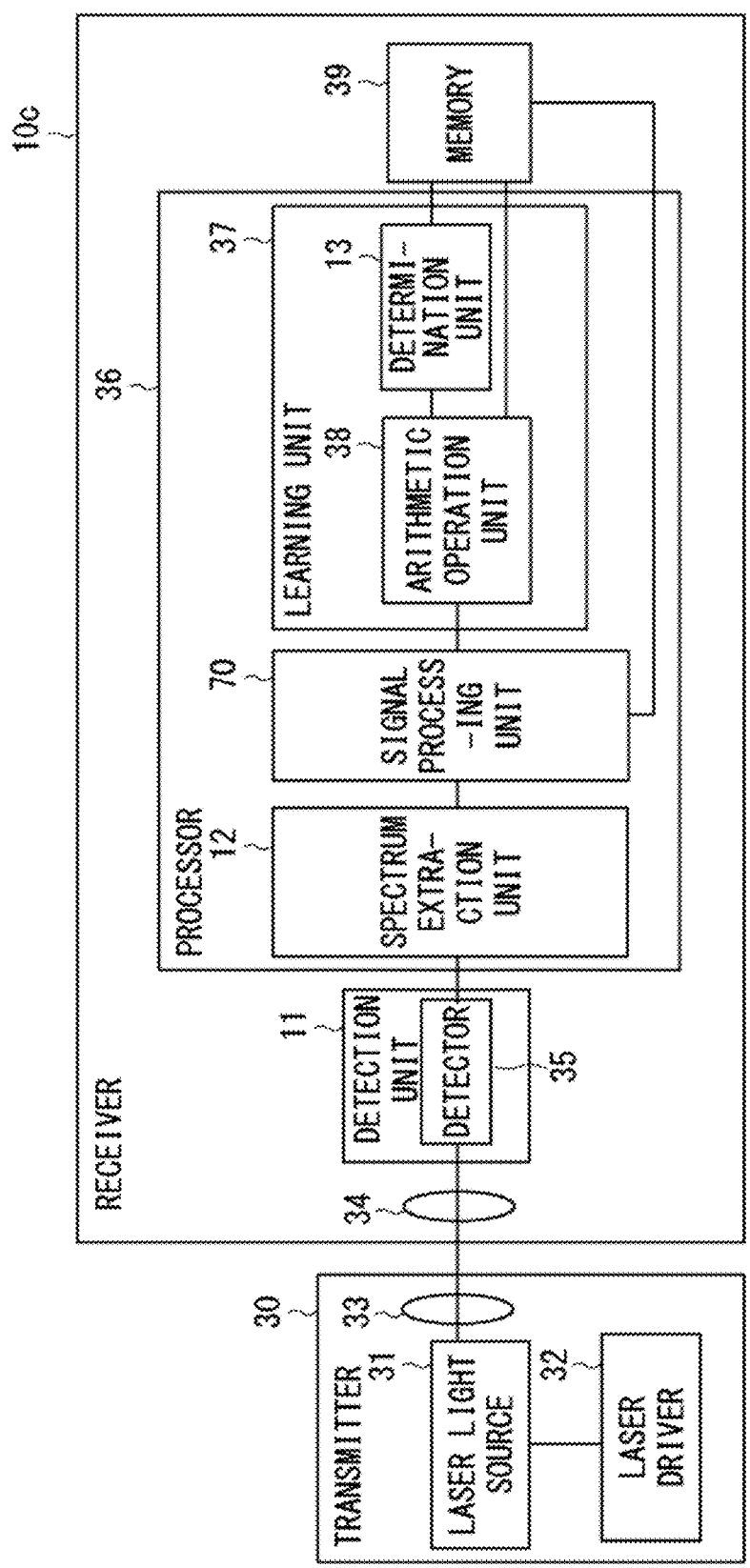
FIG. 10 is a block diagram illustrating an anomaly detection system according to a fourth example embodiment of the present disclosure.

Next, a fourth example embodiment of the present disclosure will be described. FIG. 10 illustrates an anomaly detection system according to the fourth example embodiment of the present disclosure. According to the present example embodiment, a receiver 10c includes a signal processing unit 70, in addition to the components of the receiver 10a according to the second example embodiment illustrated in FIG. 4. The signal processing unit 70 may be software or a module whose process is executed as the processor 36 executes a program stored in the memory. Alternatively, the signal processing unit 70 may be hardware, such as a circuit or a chip. Other features may be similar to those according to the second example embodiment.

The signal processing unit (signal processing means) 70 performs signal processing on an optical signal extracted by the spectrum extraction unit 12. The signal processing performed by the signal processing unit 70 includes at least one of data compression for reducing the number of data points of an optical signal, amplification of the signal intensity, or data shaping. In the learning unit 37, during learning, the arithmetic operation unit 38 performs learning by use of an optical signal subjected to signal processing by the signal processing unit 70. Meanwhile, during use, the arithmetic operation unit 38 calculates the likelihood of a state being anomalous or normal by use of an optical signal subjected to signal processing by the signal processing unit 70.

Figure 11:
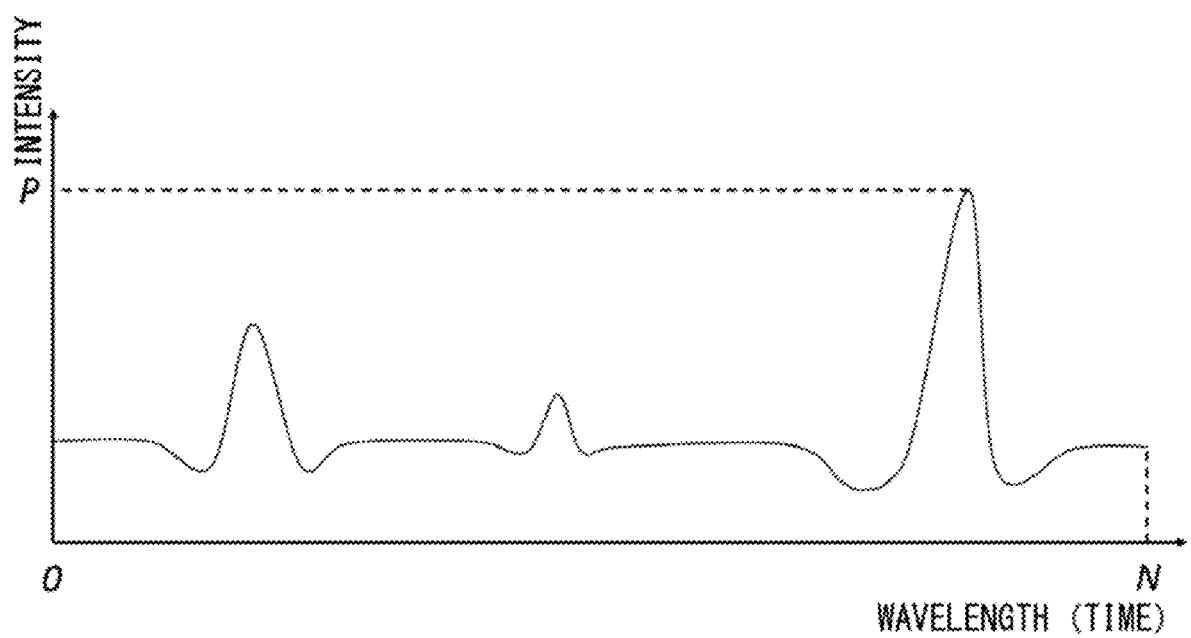
FIG. 11 is a waveform diagram illustrating an optical signal observed before signal processing.

FIG. 11 illustrates the spectral intensity of an optical signal observed before the signal processing. In FIG. 11, the vertical axis represents the signal intensity, and the horizontal axis represents the wavelength or the time. Before the signal processing, the maximum optical intensity of the optical signal is P. In the spectral intensity, the number of data points in the time-axis or wavelength-axis direction is N.

Figure 12:
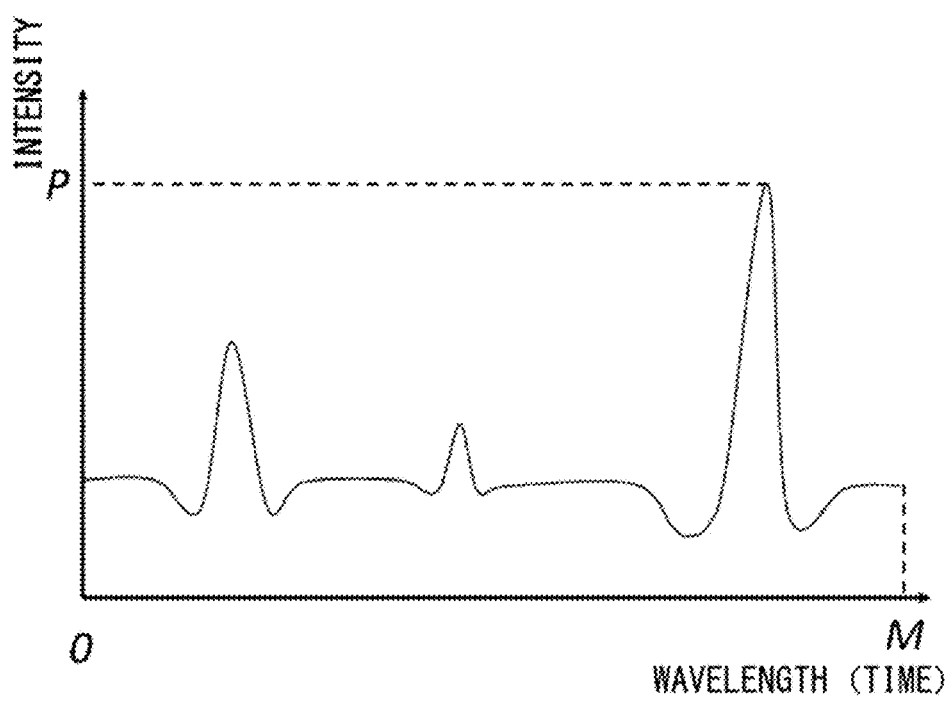
FIG. 12 is a waveform diagram illustrating an optical signal observed after data compression.

FIG. 12 illustrates the spectral intensity of the optical signal observed after data compression. In data compression, the signal processing unit 70 compresses the data while retaining local maxima and local minima of the change in the intensity that arises as the optical signal is absorbed by molecules. In FIG. 12, the vertical axis represents the signal intensity, and the horizontal axis represents the wavelength or the time. In the spectral intensity of the optical signal illustrated in FIG. 11, for example, the signal processing unit 70 compresses the data in the wavelength-axis direction without changing the values of the six local minima and the three local maxima. Specifically, as illustrated in FIG. 12, the signal processing unit 70 compresses the number of data points in the wavelength-axis direction from N to M, where M is a natural number smaller than N.

Figure 13:
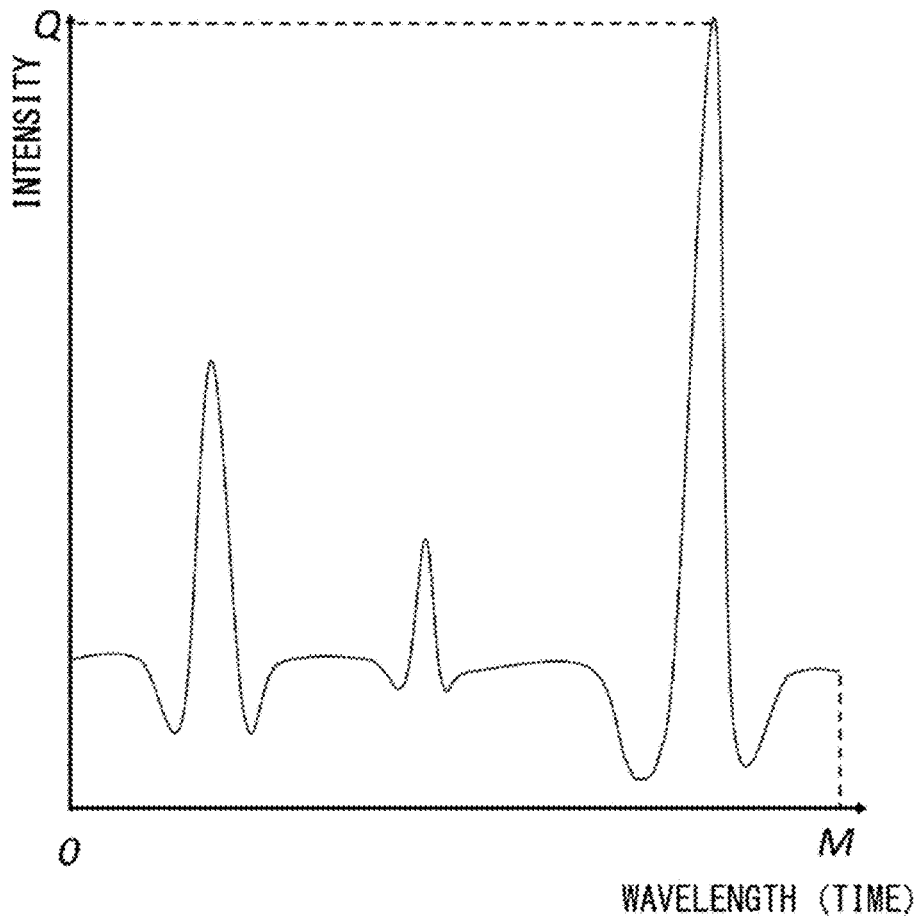
FIG. 13 is a waveform diagram illustrating a spectral intensity of an optical signal observed after its signal intensity has been amplified.

FIG. 13 illustrates the spectral intensity of an optical signal observed after its signal intensity has been amplified. In amplification of the signal intensity, the signal processing unit 70 amplifies the signal in order to emphasize the change in the intensity in the spectral intensity. In the intensity spectrum of the optical signal illustrated in FIG. 11 or 12, for example, the signal processing unit 70 amplifies the signal intensity with a predetermined amplification factor greater than one. For example, when the intensity spectrum illustrated in FIG. 12 is amplified, the maximum signal intensity can be raised from P to Q, where Q is a value greater than P. Amplifying the signal intensity makes it possible to emphasize a small change in the received signal.

Figure 14:
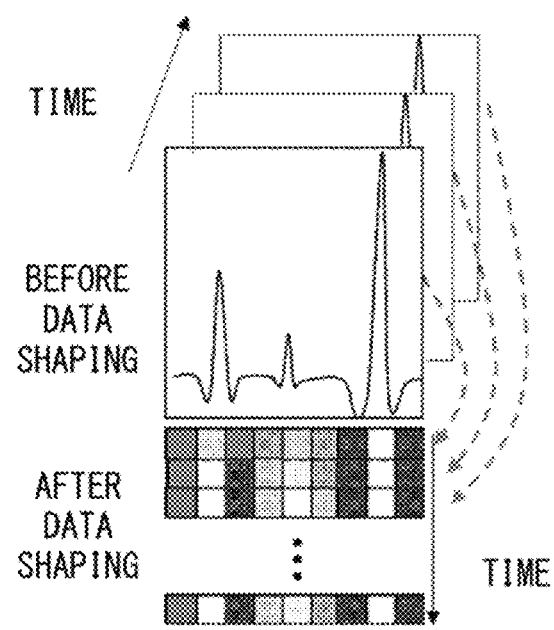
FIG. 14 is a schematic diagram illustrating data shaping.

FIG. 14 illustrates data shaping of the spectral intensity. The signal processing unit 70 shapes the spectral intensity of optical signals obtained through a plurality of instances of wavelength sweeping into two-dimensional data, for example. When shaping the spectral intensity into the two-dimensional data, the signal processing unit 70 arrays each piece of data from one instance of wavelength sweeping in the longitudinal direction. In FIG. 14, the display gradation (the density) of each block represents the signal intensity at each time (each wavelength). The density of each block may correspond to the representative value of the signal intensity in each predetermined wavelength range. In that case, the signal processing unit 70 may adopt, as the representative value, a predetermined statistical quantity, such as the mean value, the mode value, or the mode value, of the signal intensity in each wavelength range.

In the shaped data, the horizontal direction corresponds to the spectral intensity from one instance of wavelength sweeping, and the vertical direction can be regarded as an image corresponding to the number of instances of wavelength sweeping. During learning, the arithmetic operation unit 38 generates a CNN model by using the two-dimensional data shaped as described above as training data. During use, the arithmetic operation unit 38 applies the shaped two-dimensional data to the trained model and calculates the likelihood of a state being anomalous or normal. In a case where an RNN or the like is used in learning, the intensity spectrum may be input to the RNN as time-series data without shaping the intensity spectrum into two-dimensional data.

According to the present example embodiment, the arithmetic operation unit 38 processes an optical signal subjected to signal processing by the signal processing unit 70. For example, in a case where the signal processing unit 70 performs data compression, the amount of arithmetic operation performed by the arithmetic operation unit 38 during learning and during use can be reduced. Meanwhile, in a case where the signal processing unit 70 amplifies the signal intensity, this makes it easier to learn the feature associated with a change in the intensity observed in an anomalous state or in a normal state, which can help improve the accuracy in detecting an anomaly. In a case where the signal processing unit 70 performs data shaping into two-dimensional data, the spectral intensity can be input to a CNN as two-dimensional image data. Other advantageous effects are similar to those according to the second example embodiment.

Figure 15:
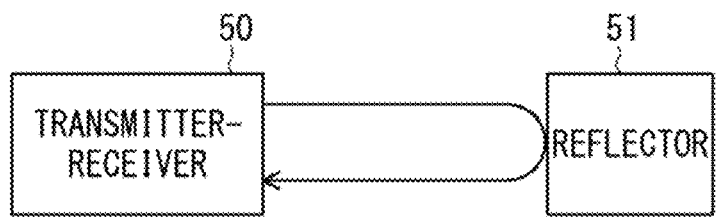
FIG. 15 is a block diagram illustrating an anomaly detection system according to a modification example of the second example embodiment.

In the example described above according to the second example embodiment, the transmitter 30 and the receiver 10a are separate, but the present disclosure is not limited by this example. According to the second example embodiment, the transmitter 30 and the receiver 10a may be integrated into one unit. FIG. 15 illustrates an anomaly detection system according to a modification example of the second example embodiment. This anomaly detection system includes a transmitter-receiver 50 and a reflector 51. The transmitter-receiver 50 includes the transmitter 30 and the receiver 10a illustrated in FIG. 4.

In the above anomaly detection system, an optical signal output from the transmitter-receiver 50 is reflected by the reflector (reflective member) 51, and the reflected optical signal is received by the transmitter-receiver 50. The use of the transmitter-receiver 50 in which a transmitter and a receiver are integrated into one unit requires only one device to be supplied with electricity, and the number of devices that need to be protected against explosion can be reduced. In a similar manner, according to the third example embodiment and the fourth example embodiment as well, the transmitter and the receiver may be integrated into one unit. According to the first example embodiment, the receiver 10 may be integrated with a transmitter to be used along with the receiver 10.

In FIG. 15, the optical signal output from the transmitter-receiver 50 is returned to the transmitter-receiver 50 by use of the reflector 51. Herein, the number of the reflector 51 is not limited to one. For example, an optical signal may be reciprocated a plurality of times through a region to be measured by use of a plurality of reflectors 51 and may then be received by the transmitter-receiver 50. This case makes it possible to increase the propagation distance of the optical signal, and this can help improve the accuracy of the measurement. According to the first example embodiment to the fourth example embodiment as well, an optical signal may be made to pass through a region to be measured a plurality of times by use of reflectors.

In the example described above according to the third example embodiment, two light sources, two detection units, and so on are disposed so as to correspond to two optical signals, but the present disclosure is not limited by this example. According to the third example embodiment, the transmitter 30b may include three or more laser light sources and three or more laser drivers, and the receiver 10b may include three or more detection units. An increase in the number of optical signals can help further improve the accuracy in detecting an anomaly.

Figure 16:
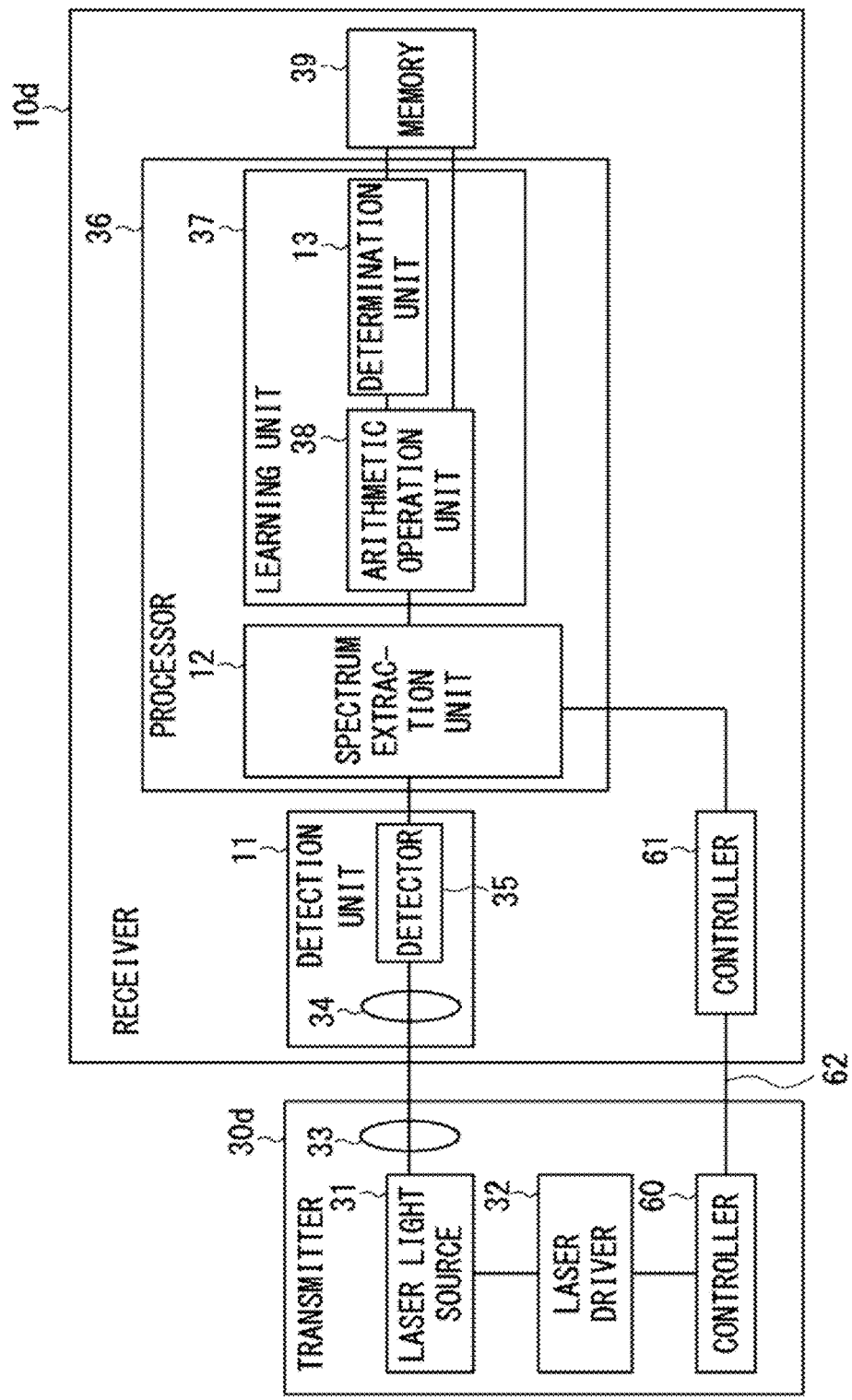
FIG. 16 is a block diagram illustrating an anomaly detection system according to a modification example of the third example embodiment.

According to the third example embodiment, it suffices that the transmitter 30b output a plurality of optical signals, and the transmitter 30b does not need to include a plurality of laser light sources. FIG. 16 illustrates an anomaly detection system according to a modification example of the third example embodiment. In this anomaly detection system, a transmitter 30d includes a controller 60, in addition to the components of the transmitter 30 according to the second example embodiment illustrated in FIG. 4. Moreover, a receiver 10d includes a controller 61, in addition to the components of the receiver 10a according to the second example embodiment. The controller 60 and the controller 61 are connected to each other via a cable 62. The controller 60 and the controller 61 may be connected to each other through wireless communication.

The transmitter 30 outputs alternately a plurality of optical signals. For example, in the transmitter 30d, the controller 60 alternates the optical signal output from the laser light source 31 between a first optical signal and a second optical signal at regular intervals by use of the laser driver 32. The time managed by the controller 60 of the transmitter 30d and the time managed by the controller 61 of the receiver 10d are synchronized via the cable 62. The controller 61 synchronizes the timings at which the optical signals are alternated at the transmitter side and the timings at which the optical signals are received. For example, the controller 61 alternates the wavelength range extracted by the spectrum extraction unit 12 between the wavelength range corresponding to the first optical signal and the wavelength range corresponding to the second optical signal at regular intervals. This configuration makes it possible to detect an anomaly by use of a plurality of optical signals even when the transmitter 30d does not physically include a plurality of laser light sources.

In the examples described according to the foregoing example embodiments, the wavelength of an optical signal output mainly from a laser light source is swept in a predetermined range, but the present disclosure is not limited by these examples. For example, in place of the laser light source, a broad-band light source that outputs an optical signal in a band broader than the absorption band of a gas to be measured may be used. For example, a light-emitting diode (LED) or the like may be used as such a broad-band light source. In a case where a broad-band light source is used, light having a plurality of wavelengths may be divided by a spectroscope, and the resulting light may be detected by the detection unit of the receiver. Synchronizing the timing at which the light having a plurality of wavelengths is divided with the detection unit makes it possible to acquire the intensity of the optical signal at each wavelength.

The foregoing example embodiments and modification examples can be combined as appropriate. For example, according to the first example embodiment, a signal processing unit that performs signal processing, such as data compression or signal intensity amplification, may be used. In a case where a plurality of optical signals are used in a combination of the third example embodiment and the fourth example embodiment, the signal processing unit 70 may perform signal processing on the plurality of optical signals.

According to the foregoing example embodiments, the programs can be stored and supplied to a processor (a computer) by use of various types of non-transitory computer-readable media. The non-transitory computer-readable media include various types of tangible recording media. Examples of the non-transitory computer-readable media include a magnetic recording medium (e.g., a flexible disk, a magnetic tape, a hard-disk drive), an optical magnetic recording medium (e.g., a magneto-optical disk), a CD-ROM, a CD-R, a CD-R/W, and a semiconductor memory (e.g., a mask ROM, a PROM (programmable ROM), an EPROM (erasable PROM), a flash ROM, a RAM). The programs may also be supplied to the computer in the form of various types of transitory computer-readable media. Examples of the transitory computer-readable media include an electric signal, an optical signal, and an electromagnetic wave. The transitory computer-readable media can supply the programs to the computer via a wired communication line, such as an electric wire or an optical fiber, or via a wireless communication line.

Thus far, the invention of the present application has been described with reference to the example embodiments, but the invention of the present application is not limited by the foregoing example embodiments. Various modifications that a person skilled in the art can appreciate can be made to the configurations and the details of the invention of the present application within the scope of the invention.

For example, a part of the whole of the foregoing example embodiments can be described also as in the following supplementary notes, which are not limiting.

[Supplementary Note 1]

A receiver, comprising:
 detection means configured to receive an optical signal that has passed through a space to be measured;
 spectrum extraction means configured to extract a range to be measured from the optical signal received by the detection means; and
 determination means configured to determine presence of an anomaly in the space to be measured based on a waveform of an optical signal extracted by the spectrum extraction means and formed as a gas molecule of a gas to be measured absorbs energy of the optical signal.

[Supplementary Note 2]

The receiver according to Supplementary Note 1, wherein the spectrum extraction means is further configured to extract a feature of the waveform of the optical signal in the range to be measured, and the determination means is configured to determine the presence of the anomaly based on the feature of a signal waveform extracted by the spectrum extraction means.

[Supplementary Note 3]

The receiver according to Supplementary Note 2, wherein the spectrum extraction means is configured to extract, as the feature, at least one of a distance between a local maximum and a local minimum in the waveform of the optical signal or a distance between two local minima located across a local maximum in the waveform of the optical signal.

[Supplementary Note 4]

The receiver according to Supplementary Note 1, further comprising learning means configured to calculate a likelihood of at least one of a state being anomalous or a state being normal based on a learning result from learning a waveform of the optical signal observed in a normal state and a waveform of the optical signal observed in an anomalous state and the waveform of the optical signal extracted by the spectrum extraction means,
wherein the determination means is configured to determine the presence of the anomaly based on the likelihood calculated by the learning means.

[Supplementary Note 5]

The receiver according to any one of Supplementary Notes 1 to 4, wherein the optical signal is transmitted in a predetermined wavelength-sweeping range and is wavelength-modulated.

[Supplementary Note 6]

The receiver according to any one of Supplementary Notes 1 to 5, further comprising signal processing means configured to perform signal processing on the optical signal extracted by the spectrum extraction means,
wherein the determination means is configured to determine the presence of the anomaly based on a waveform of the optical signal subjected to the signal processing.

[Supplementary Note 7]

The receiver according to Supplementary Note 6, wherein the signal processing includes at least one of data compression for reducing the number of data points in the optical signal, amplification for amplifying a signal intensity of the optical signal, or data shaping for shaping data indicating the waveform of the optical signal.

[Supplementary Note 8]

The receiver according to any one of Supplementary Notes 1 to 7, wherein
the optical signal includes two or more optical signals having different wavelengths,
the detection means is configured to receive each of the two or more optical signals,
the spectrum extraction means is configured to extract a range to be measured from each of the received two or more optical signals, and
the determination means is configured to determine the presence of the anomaly based on each waveform of the two or more optical signals.

[Supplementary Note 9]

The receiver according to Supplementary Note 8, wherein the detection means includes two or more detectors configured to receive the respective two or more optical signals.

[Supplementary Note 10]

The receiver according to Supplementary Note 8, wherein the two or more optical signals are output alternately into the space to be measured, and
each of the two or more optical signals is received in synchronization with a timing at which the optical signals are alternated.

[Supplementary Note 11]

The receiver according to Supplementary Note 10, further comprising a controller configured to synchronize the timing at which the optical signals are alternated and a timing at which each optical signal is received.

[Supplementary Note 12]

An anomaly detection system, comprising:
a transmitter configured to transmit an optical signal into a space to be measured; and
a receiver configured to receive the optical signal that has passed through the space to be measured,
wherein the receiver includes:
detection means configured to receive the optical signal;
spectrum extraction means configured to extract a range to be measured from the optical signal received by the detection means; and
determination means configured to determine presence of an anomaly in the space to be measured based on a waveform of an optical signal extracted by the spectrum extraction means and formed as a gas molecule of a gas to be measured absorbs energy of the optical signal.

[Supplementary Note 13]

The anomaly detection system according to Supplementary Note 12, wherein the transmitter includes:
a light source configured to output the optical signal; and
a driver configured to drive the light source to sweep a wavelength by modulating the wavelength of the optical signal output from the light source.

[Supplementary Note 14]

The anomaly detection system according to Supplementary Note 12, wherein the transmitter includes a light source configured to output an optical signal of a band broader than an absorption band of the gas to be measured.

[Supplementary Note 15]

The anomaly detection system according to any one of Supplementary Notes 12 to 14, wherein
the spectrum extraction means is further configured to extract a feature of the waveform of the optical signal in the range to be measured, and
the determination means is configured to determine the presence of the anomaly based on the feature of a signal waveform extracted by the spectrum extraction means.

[Supplementary Note 16]

The anomaly detection system according to Supplementary Note 15, wherein the spectrum extraction means is configured to extract, as the feature, at least one of a distance between a local maximum and a local minimum in the waveform of the optical signal or a distance between two local minima located across a local maximum in the waveform of the optical signal.

[Supplementary Note 17]

The anomaly detection system according to any one of Supplementary Notes 12 to 14, wherein
the receiver further includes learning means configured to calculate a likelihood of at least one of a state being anomalous or a state being normal based on a learning result from learning a waveform of the optical signal observed in a normal state and a waveform of the optical signal observed in an anomalous state and the waveform of the optical signal extracted by the spectrum extraction means, and the determination means is configured to determine the presence of the anomaly based on the likelihood calculated by the learning means.

[Supplementary Note 18]

The anomaly detection system according to any one of Supplementary Notes 12 to 17, wherein the receiver further includes signal processing means configured to perform signal processing on the optical signal extracted by the spectrum extraction means, and the determination means is configured to determine the presence of the anomaly based on a waveform of the optical signal subjected to the signal processing.

[Supplementary Note 19]

The anomaly detection system according to Supplementary Note 18, wherein the signal processing includes at least one of data compression for reducing the number of data points in the optical signal, amplification for amplifying a signal intensity of the optical signal, or data shaping for shaping data indicating the waveform of the optical signal.

[Supplementary Note 20]

The anomaly detection system according to any one of Supplementary Notes 12 to 19, wherein the transmitter is configured to output two or more optical signals having different wavelengths, the detection means is configured to receive each of the two or more optical signals, the spectrum extraction means is configured to extract a range to be measured from each of the received two or more optical signals, and the determination means is configured to determine the presence of the anomaly based on each waveform of the two or more optical signals.

[Supplementary Note 21]

The anomaly detection system according to Supplementary Note 20, wherein the transmitter includes light sources corresponding to the respective two or more optical signals, and the detection means includes two or more detectors configured to receive the respective two or more optical signals.

[Supplementary Note 22]

The anomaly detection system according to Supplementary Note 20, wherein the transmitter is configured to output alternately the two or more optical signals, and the receiver is configured to receive each of the two or more optical signals in synchronization with a timing at which the optical signals are alternated in the transmitter.

[Supplementary Note 23]

The anomaly detection system according to Supplementary Note 22, wherein the transmitter includes a controller configured to control the timing at which the optical signals are alternated, and the receiver further includes a controller configured to synchronize the timing at which the optical signals are alternated in the transmitter and a timing at which each optical signal is received.

[Supplementary Note 24]

The anomaly detection system according to any one of Supplementary Notes 12 to 23, wherein the transmitter and the receiver are integrated into a transmitter-receiver, and the anomaly detection system further includes a reflective member configured to reflect an optical signal output from the transmitter-receiver toward the transmitter-receiver.

[Supplementary Note 25]

An anomaly detection method, comprising:

receiving an optical signal that has passed through a space to be measured;

extracting a range to be measured from the received optical signal; and determining presence of an anomaly in the space to be measured based on an extracted waveform of an optical signal formed as a gas molecule of a gas to be measured absorbs energy of the optical signal.

[Supplementary Note 26]

A computer-readable medium storing a program that causes a processor to execute a process for:

extracting a range to be measured from a received optical signal that has passed through a space to be measured; and determining presence of an anomaly in the space to be measured based on an extracted waveform of an optical signal formed as a gas molecule of a gas to be measured absorbs energy of the optical signal.

INDUSTRIAL APPLICABILITY

The present disclosure can be applied to the detection of a fire in an extended area. In particular, the present disclosure can be applied to the detection of a fire while the amount of produced gas is still small, for example, at an initial stage of the fire. Moreover, the present disclosure can also be applied to the detection of a gas leakage where the amount of the gas leakage is small.

REFERENCE SIGNS LIST

10: receiver
11, 44: detection unit
12: spectrum extraction unit
13, 48: determination unit
30: transmitter
31, 41: laser light source
32, 42: laser driver
33, 34, 43, 45: condenser
35, 46: detector
36: processor
37: learning unit
38, 47: arithmetic operation unit
39: memory
50: transmitter-receiver
51: reflector
60, 61: controller
62: cable
70: signal processing unit

What is claimed is:

1. A receiver, comprising:

a memory storing instructions;

a processor configured to execute the instructions; and at least one detector configured to receive an optical signal that has passed through a measurement space;

wherein the processor is configured to execute the instructions to:

extract an optical signal falling within a measurement range from the optical signal received by the at least one detector;

determine a presence of an anomaly in the measurement space using a waveform of the extracted optical signal formed as a gas molecule of a measurement gas absorbs energy of the optical signal; and perform signal processing on the extracted optical signals obtained by performing a plurality of instances of wavelength sweeping to shape spectral intensity of the extracted optical signals into two-dimensional data in which a first direction corresponds to one wavelength sweeping and a second direction corresponds to a number of the wavelength sweeping, wherein the presence of an anomaly is determined using the two-dimensional data.

2. The receiver according to claim 1, wherein the processor is configured to execute the instructions to:

extract a feature of the waveform of the optical signal in the measurement range; and determine the presence of the anomaly using the extracted feature of the waveform.

3. The receiver according to claim 2, wherein the processor is configured to execute the instructions to extract, as the feature, at least one of a distance between a local maximum and a local minimum in the waveform of the optical signal or a distance between two local minima located across a local maximum in the waveform of the optical signal.

4. The receiver according to claim 1, wherein the processor is configured to execute the instructions to:

calculate a likelihood of at least one of a state being anomalous or a state being normal using a learning result from learning a waveform of the optical signal observed in a normal state and a waveform of the optical signal observed in an anomalous state and the waveform of the extracted optical signal; and determine the presence of the anomaly using the calculated likelihood.

5. The receiver according to claim 1, wherein the optical signal is transmitted in a predetermined wavelength-sweeping range and is wavelength-modulated.

6. The receiver according to claim 1, wherein:

the optical signal includes two or more optical signals having different wavelengths, the at least one detector is configured to receive each of the two or more optical signals, and the processor is configured to execute the instructions to:

extract a measurement range from each of the received two or more optical signals; and determine the presence of the anomaly using each waveform of the two or more optical signals.

7. The receiver according to claim 6 comprising two or more detectors configured to receive the respective two or more optical signals.

8. The receiver according to claim 6, wherein:

the two or more optical signals are output alternately into the measurement space, and each of the two or more optical signals is received in synchronization with a timing at which the optical signals are alternated.

9. The receiver according to claim 8, further comprising a controller configured to synchronize the timing at which the optical signals are alternated and a timing at which each optical signal is received.

10. An anomaly detection system, comprising:

a transmitter configured to transmit an optical signal into a measurement space; and the receiver according to claim 1.

11. The anomaly detection system according to claim 10, wherein the transmitter includes:

a light source configured to output the optical signal; and a driver configured to drive the light source to sweep a wavelength by modulating the wavelength of the optical signal output from the light source.

12. The anomaly detection system according to claim 10, wherein the transmitter includes a light source configured to output an optical signal of a band broader than an absorption band of the measurement gas.

13. The anomaly detection system according to claim 10, wherein the processor is configured to execute the instructions to:

extract a feature of the waveform of the optical signal in the measurement range; and determine the presence of the anomaly using the extracted feature of the waveform.

14. The anomaly detection system according to claim 13, wherein the processor is configured to execute the instructions to extract, as the feature, at least one of a distance between a local maximum and a local minimum in the waveform of the optical signal or a distance between two local minima located across a local maximum in the waveform of the optical signal.

15. The anomaly detection system according to claim 10, wherein the processor is configured to execute the instructions to:

calculate a likelihood of at least one of a state being anomalous or a state being normal using a learning result from learning a waveform of the optical signal observed in a normal state and a waveform of the optical signal observed in an anomalous state and the waveform of the extracted optical signal; and determine the presence of the anomaly using the calculated likelihood.

16. An anomaly detection method, comprising:

receiving an optical signal that has passed through a measurement space;

extracting an optical signal falling within a measurement range from the received optical signal;

determining a presence of an anomaly in the measurement space using a waveform of the extracted optical signal formed as a gas molecule of a measurement gas absorbs energy of the optical signal; and performing signal processing on the extracted optical signals obtained by performing a plurality of instances of wavelength sweeping to shape spectral intensity of the extracted optical signals into two-dimensional data in which a first direction corresponds to one wavelength sweeping and a second direction corresponds to a number of the wavelength sweeping, wherein the presence of an anomaly is determined using the two-dimensional data.

17. A non-transitory computer-readable medium storing a program that, if executed, causes a processor to execute a process comprising:

extracting an optical signal falling within a measurement range from a received optical signal that has passed through a measurement space;

determining a presence of an anomaly in the measurement space using a waveform of the extracted optical signal formed as a gas molecule of a measurement gas absorbs energy of the optical signal; and performing signal processing on the extracted optical signals obtained by performing a plurality of instances of wavelength sweeping to shape spectral intensity of the extracted optical signals into two-dimensional data in which a first direction corresponds to one wavelength sweeping and a second direction corresponds to a number of the wavelength sweeping,
wherein
the presence of an anomaly is determined using the two-dimensional data.

* * * * *